United States Patent [19]

Hensley, Jr. et al.

[11] 4,224,144

[45] Sep. 23, 1980

[54] HYDROTREATING A HYDROCARBON STREAM TO REMOVE NITROGEN AND SULFUR

[75] Inventors: Albert L. Hensley, Jr., Munster, Ind.; Leonard M. Quick, Naperville; P. Donald Hopkins, St. Charles, both of Ill.

[73] Assignee: Standard Oil Company (Indiana), Chicago, Ill.

[21] Appl. No.: 21,575

[22] Filed: Mar. 19, 1979

[51] Int. Cl.² .............................................. C10G 23/02
[52] U.S. Cl. .......................... 208/216 PP; 208/254 H
[58] Field of Search ......... 208/216 PP, 216 R, 254 H, 208/251 H

[56] References Cited

U.S. PATENT DOCUMENTS

| | | | |
|---|---|---|---|
| 2,577,823 | 12/1951 | Stine | 208/216 R |
| 3,114,701 | 12/1963 | Jacobson et al. | 208/254 H |
| 3,245,919 | 4/1966 | Gring et al. | 208/216 PP |
| 3,265,615 | 8/1966 | Buss et al. | 208/254 H |
| 3,340,180 | 9/1967 | Beuther et al. | 208/216 R |
| 3,956,105 | 5/1976 | Conway | 208/216 R |
| 3,977,961 | 8/1976 | Hamner | 208/251 H |
| 4,008,149 | 2/1977 | Itoh et al. | 208/254 H |
| 4,066,574 | 1/1978 | Tamm | 208/216 PP |

FOREIGN PATENT DOCUMENTS 2281972 12/1976 France .
1367243 9/1974 United Kingdom .

Primary Examiner—George Crasanakis
Attorney, Agent, or Firm—David E. Boone; William T. McClain; William H. Magidson

[57] ABSTRACT

A process for hydrotreating a hydrocarbon stream such as petroleum distillate and similar hydrocarbon materials by contacting said stream with hydrogen and a catalyst comprising a porous refractory inorganic oxide support and deposited thereon hydrogenation components comprising chromium, molybdenum and at least one Group VIII metal. This process enables improved removal of nitrogen and sulfur, particularly from gas oils.

28 Claims, 3 Drawing Figures

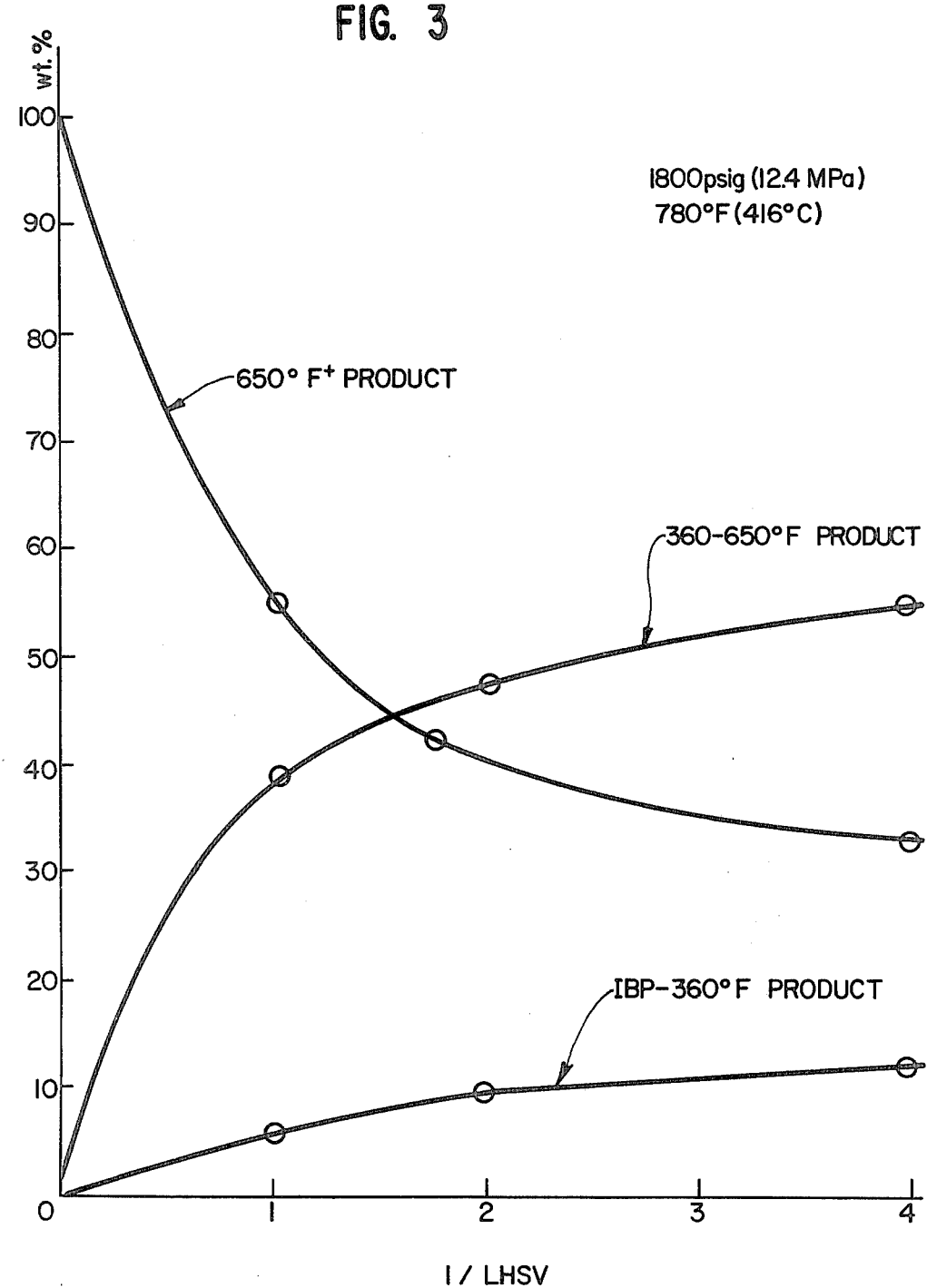

HYDROTREATING A HYDROCARBON STREAM TO REMOVE NITROGEN AND SULFUR

BACKGROUND

This invention relates to catalytic hydrotreatment of petroleum distillates and similar hydrocarbon materials. More particularly, this invention relates to the use of catalyst comprising a chromium component with molybdenum and Group VIII metal components, in such hydrotreating processes.

In the petroleum refining industry, hydrotreating processes are in wide use for effecting hydrodesulfurization and other upgrading treatment of hydrocarbon stocks, typically carried out in the presence of a catalyst. Hydrofining refers generally to the treatment of solvents and distillates with hydrogen and is typically a catalytic hydrogenation. Hydrofining is employed to remove sulfur, nitrogen and other non-hydrocarbon components, as well as to improve the odor, color, stability, and other important quality characteristics. Typical applications range from relatively mild hydrosweetening operations carried out at high space velocities, very low pressures and temperatures, and minimal hydrogen consumption, to more severe operations such as desulfurization and denitrification of heavy vacuum gas oils, decanted oils and lubricating oils. Sulfur and nitrogen compounds are often poisonous to the activity of catalysts employed when such carbonaceous feedstocks are further processed such as in hydrocracking and fluid catalytic cracking. When applied for processing catalytic cracking feedstocks, hydrofining can significantly reduce catalyst coking and improve the quality of catalytic cracking stock resulting in increased gasoline yield as well as sulfur or nitrogen removal.

Generally, the catalysts employed in hydrofining are comprised of composites of Group VIB or Group VIII metal hydrogenating components, or both, with an inorganic oxide base, or support, typically alumina. For example U.S. Pat. No. 3,245,919, Gring, et al., discloses hydrocarbon conversion processes that employ a catalyst containing a catalytic amount of a metal component selected from metals of Group VI and Group VIII supported on alumina. The patent summarizes the prior art catalyst materials which can include compounds of Groups VI and VIII metals such as chromium, molybdenum, tungsten, iron, nickel cobalt, and the platinum group noble metals, or mixtures of two or more such compounds (column 6, lines 12 through 19), but does not disclose an example of chromium and molybdenum in the same catalytic composition. Gring specifically discloses catalytic compositions in which only one of the two Group VI metals is employed and teaches the use of the catalytic composition containing molybdenum with cobalt for desulfurization and the catalyst containing chromium for dehydrogenation.

U.S. Pat. No. 3,114,701, Jacobson, et al., refers in general to prior art processes for hydrofining hydrocarbon oil by contact with various catalysts, generally comprising chromium and/or molybdenum oxides together with iron, cobalt, and/or nickel oxides on a porous oxide support, such as alumina or silica-alumina (column 1, lines 25 through 30). However, this patent teaches a hydrodenitrification process employing a catalyst containing large concentrations of nickel and molybdenum on a predominantly alumina carrier; the patent does not provide any examples using a specific catalytic composition comprising chromium, molybdenum, and a Group VIII metal.

U.S. Pat. No. 2,577,823 (Stine, 1951) discloses that heavy hydrocarbon fractions, such as gas oil and reduced crude, can be hydrodesulfurized over a catalyst consisting of chromium, molybdenum, and aluminum oxides, but this patent does not disclose or suggest that a Group VIII metal component be incorporated in such catalyst.

U.S. Pat. No. 3,265,615 (Buss, 1966) discloses a method for hydrotreating hydrocarbon oil employing a catalyst comprising chromic sulfide and molybdenum sulfide prepared by the particular method of his invention. Buss discloses that in contrast to prior art catalysts containing both a Group VI and a Group VIII component, the "absence of a Group VIII component" in the catalyst prepared by his method permits an advantage in the removal of nitrogen, as pointed out in column 5, lines 35–50. Buss discloses a catalyst prepared by impregnating an alumina support with ammonium molybdate, then drying and calcining to produce a molybdenum oxide-alumina precursor which was then impregnated with an aqueous solution of chromic sulfate and dried overnight at low temperature; Buss teaches that the chromic sulfate must be subsequently reduced by treatment with hydrogen, and then the material is sulfided to produce the chromium sulfide-molybdenum sulfide-alumina catalyst. In contrast, the catalyst employed in the process of the present invention comprises a Group VIII metal component and the catalyst does not require reduction of sulfate to sulfide in its preparation.

French Pat. No. 2,281,972 discloses the preparation of a catalyst comprising the oxides of cobalt, molybdenum, and/or nickel on a base of both alumina oxide and 3 to 15 wt.% chromium oxide and its use for the refining of hydrocarbon fractions such as the hydrodesulfurization of fuel oils obtained by vacuum distillation or residual oils obtained by atmospheric distillation. The support base of this catalyst is composed of aluminum oxide and chromium oxide and is preferably prepared by the coprecipitation of compounds of chromium and aluminum; in contrast the catalyst employed in the process of the present invention comprises an inorganic oxide support, preferably alumina, upon which a compound of chromium is deposed or impregnated.

Quick et al. in copending U.S. patent application Ser. No. 967,413, filed Dec. 7, 1978, which is incorporated herein by reference, discloses a process for hydrotreating a heavy hydrocarbon stream containing metals, asphaltenes, nitrogen compounds, and sulfur compounds, which process comprises contacting said stream under suitable conditions and in the presence of hydrogen with a catalyst comprising a hydrogenating component selected from the group consisting of (1) molybdenum, chromium and a small amount of cobalt, (2) their oxides, (3) their sulfides, and (4) mixtures thereof on a large-pore, catalytically active alumina. Quick et al. disclose that such process is particularly useful for hydrotreating heavy hydrocarbon streams such as petroleum residua, both atmospheric resids and vacuum resids, tar sands oils, tar sands resids, and liquids obtained from coal. This application also suggest that such process can be employed to satisfactorily hydrotreat petroleum hydrocarbon distillates, such as gas oils, cycle stocks, and furnace oils; however, no example of the treatment of such distillate is presented.

Typical commercial hydrofining catalysts are molybdena on alumina, cobalt molybdate on alumina, nickel molybdate on alumina or nickel tungstate on alumina. The specific catalyst used depends on the particular application. Cobalt molbydate catalyst is often used when sulfur removal is the primary interest. The nickel catalysts find application in the treating of cracked stocks for olefin or aromatic saturation. Sweetening to remove mercaptans is a preferred application for molybdena catalysts. Denitrification is generally effected by the use of a supported sulfided catalyst containing nickel and molybdenum.

The primary objective of the present invention is to achieve improved hydrotreating of petroleum distillates and similar materials. An additional objective is to provide improved catalyst for use in such hydrotreating processes.

We have found that the objects of this invention can be achieved by contacting hydrocarbon streams such as petroleum distillates and similar materials with hydrogen and a catalyst comprising chromium, molybdenum, and at least one Group VIII metal hydrogenation components deposited on a porous refractory inorganic oxide support, which is effective in the removal of both sulfur and nitrogen from such hydrocarbon streams, in contrast to catalyst which does not contain chromium with Group VIII metal.

Typical feedstocks that can be treated satisfactorily by the process of the present invention generally comprise distillates from petroleum and tar sands as well as similar materials such as shale oil and fractions thereof. Generally, these hydrocarbon streams are substantially free from asphaltenic materials and will usually contain only trace amounts of metals such as nickel and vanadium, thus permitting sulfur and nitrogen to be removed more readily than such removal from heavy hydrocarbon streams such as petroleum resid and whole tar sands oil. While lighter distillates such as naphthas, kerosene and diesel fractions can be treated by the process of the present invention, particularly effective removal of sulfur and nitrogen from heavier distillate such as gas oils, decanted oils, lubricating oils and recycle streams can be obtained employing the process of this invention in more severe operation. Typical heavy gas oil streams are obtained by vacuum distillation of petroleum as well as gas oils obtained by coking reduced crude, vacuum resid and similar materials such as tar sands oil. In addition to removing sulfur and nitrogen, treatment of gas oil and similar heavy distillate streams at high temperature in the process of this invention can achieve substantial hydrocracking of heavy components in such feedstocks.

The hydrogenation components of the catalyst employed in the process of the present invention comprise chromium, molybdenum, and at least one Group VIII metal, preferably cobalt; as used herein, the term "hydrogenation components" is meant to include Group VIII metal, molybdenum, and chromium present in the catalyst in the elemental form, as oxides of the metals, as sulfides of the metals, or mixtures thereof. Group VIII metals selected from iron, cobalt, nickel, ruthenium, rhodium, platinum, palladium, osmium, and iridium, can be employed as a hydrogenation component and cobalt is the preferred Group VIII metal component. Suitably, the Group VIII metal, exemplified by cobalt, is present in the catalyst in the range of about 0.1 wt.% to about 5 wt.%, calculated as the oxide of the metal and based upon the total catalyst weight; the chromium is present in an amount within the range of about 5 wt.% to about 30 wt.%, calculated as $Cr_2O_3$ and based upon the total catalyst weight, and molybdenum is present in an amount within the range of about 5 wt.% to about 20 wt.%, calculated as $MoO_3$ and based upon the total catalyst weight. Preferably, the cobalt is present in an amount within the range of about 0.5 wt.% to about 2.5 wt.%, calculated as CoO and based upon the total catalyst weight, the chromium is present in an amount within the range of about 7-20 wt.%, calculated as $Cr_2O_3$ and based upon the total catalyst weight, and the molybdenum is present in an amount within the range of about 7-15 wt.%, calculated as $MoO_3$ and based upon the total catalyst weight, such components being deposited on a catalytically active alumina support. Chromium and molybdenum contents of the catalyst in excess of these preferred ranges add expense and appear to provide no appreciable gain in catalyst activity, while levels of chromium and molybdenum less than these preferred ranges appear to provide decreased catalyst activity; a cobalt content in excess of the preferred range appears to cause accelerated deactivation of the catalyst, yet the cobalt content should not be less than the preferred range in order to provide sufficient activity for commercial use.

BRIEF DESCRIPTION OF THE DRAWING

FIG. 3 presents conversion of a tar sands oil distillate into lighter products in an embodiment of the process of this invention.

Figure 1:
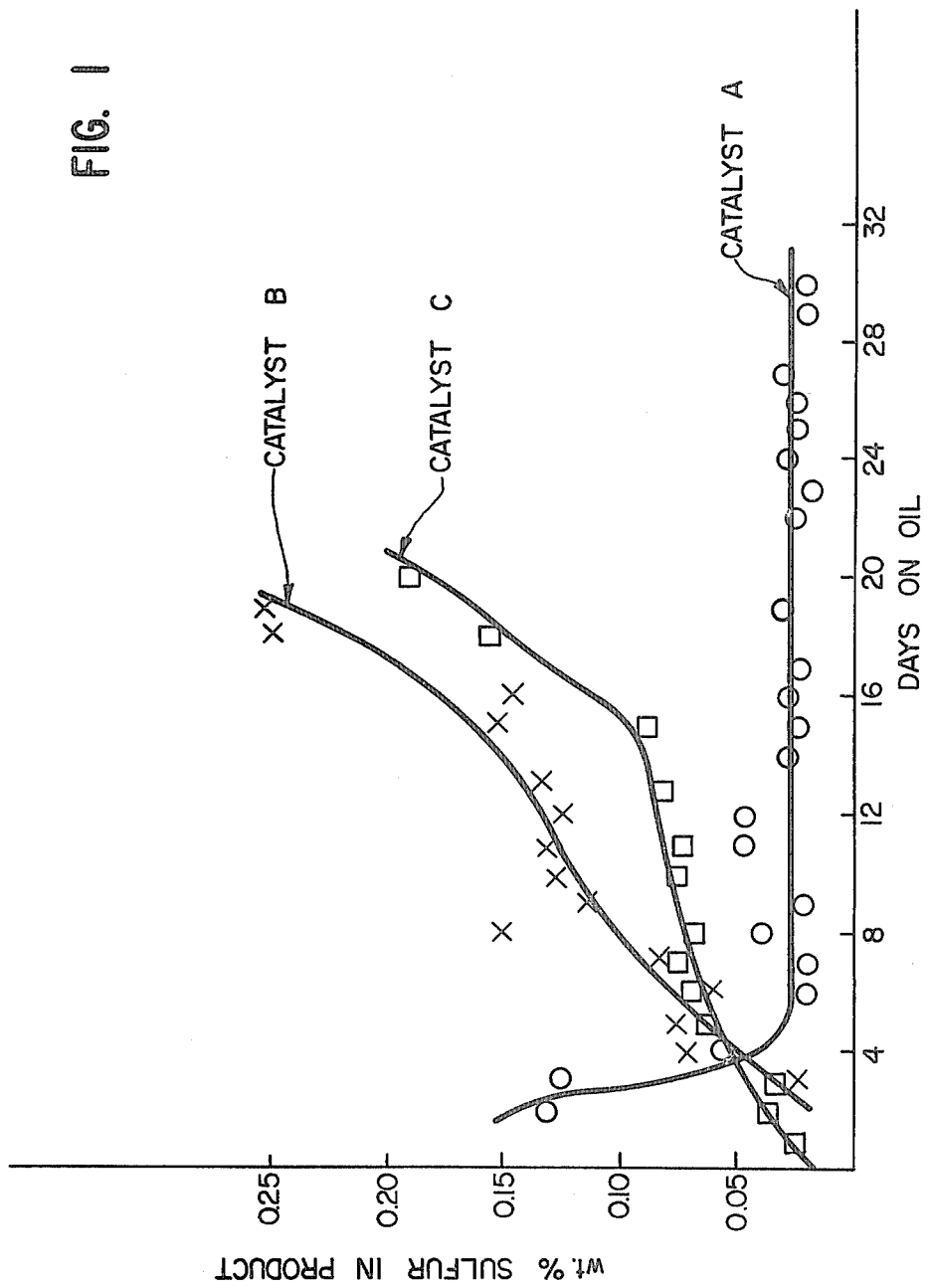
FIG. 1 depicts comparative desulfurization performance of commercial catalyst and a catalyst employed in the process of this invention.

If preparing the catalyst employed in the process of this invention, chromium, molybdenum, and Group VIII metal hydrogenation components can be deposited upon a porous refractory inorganic oxide support or carrier such as alumina, silica-alumina, silica, magnesia, zirconia, and similar materials, for example by impregnation of the support with compounds of the metals. Desirably, after the hydrogenation metals are deposited on the support the material is formed into pellets, or extruded, and then calcined. The catalyst can be prepared by the typical commercial method of impregnating the hydrogenation components upon high surface area refractory inorganic oxide support with one or more solutions, usually aqueous, of heat-decomposable compounds of the appropriate metals. The impregnation can be a co-impregnation when a single solution is employed. Alternatively, sequential impregnation of the metals from two or more solutions can be employed. Generally, the impregnated support is dried at a temperature of at least 250° F. (121° C.) for a period of at least one hour and calcined in air at a temperature of at least 800° F. (427° C.), and preferably at least 1,000° F. (538° C.), for at least two hours.

Preferably, the catalyst used in the process of this invention is prepared by impregnating an alumina support with the aqueous solution or solutions containing the heat-decomposable salts of chromium, molybdenum, and cobalt. Suitable high surface area alumina is preferably employed as the catalyst support; alumina is a preferred support based upon superior stability and activity in general desulfurization and denitrogenation service. The alumina should have a pore volume that is in excess of 0.4 cc/gm, a surface area that is in excess of 150 m²/gm, and an average pore diameter that is greater than about 60 Angstroms. Such alumina is commercially available, for example, from American Cyanamid Company, and from Continental Oil Company under the tradename "CATAPAL." Generally, such alumina is commercially available in hydrate form such as the alphamonohydrate, boehmite, or in calcined form such as gamma-alumina; other aluminas such as eta-alumina and its hydrate precursors can also be employed for the catalyst support.

The finished catalyst that is employed in the process of the present invention should have a pore volume within the range of about 0.4 cc/gm to about 0.8 cc/gm, a surface area within the range of about 150 m²/gm to about 300 m²/gm, and an average pore diameter within the range of about 60 Å to about 200 Å. Preferably, the catalyst has a pore volume within the range of about 0.5 cc/gm to about 0.7 cc/gm, a surface area within the range of about 150 m²/gm to about 250 m²/gm, and an average pore diameter within the range of about 70 Å to about 150 Å. The catalyst should have about 0% to about 50% of its pore volume in pores having diameters that are smaller than 50 Å, about 30% to about 80% of its pore volume in pores having diameters of about 50 Å to about 100 Å, about 0% to about 50% of its pore volume in pores having diameters of about 100 Å to about 150 Å, and about 0% to about 20% of its pore volume in pores that are larger than 150 Å. Best results have been obtained with catalyst having a pore volume distribution summarized as follows:

| Pore Diameters, Å | % of Pore Volume |
|---|---|
| 0–50 | 20–50 |
| 50–100 | 30–70 |
| 100–150 | 0–20 |
| 150+ | 0–10 |

Values specified for catalyst surface area are obtained by the BET nitrogen adsorption method. Values specified for pore volume are also obtained by nitrogen adsorption and specified average pore diameters are those calculated by means of the expression:

$$A.P.D. = (4 \times P.V. \times 10^4)/S.A.$$

wherein
A.P.D. = average pore diameter in Å,
P.V. = pore volume in cc/gm, and
S.A. = surface area in m²/gm Pore size distributions are obtained by a Digisorb 2500 instrument employing nitrogen desorption techniques.

The catalyst used in the process of this invention can be employed in the form of a fixed-bed or an ebullated-bed of particles. In the case of a fixed-bed catalyst particle size should be about 1/32–⅛ in. (0.08–0.32 cm) effective diameter.

The conditions employed in operation of the process of the present invention will vary with the particular hydrocarbon stream being treated, with mild conditions employed in the hydrotreatment of light distillate such as naphtha and kerosene, typically 450° to 600° F. (232° to 316° C.) and about 100 to 600 psi (690 to 4137 kPa) hydrogen partial pressure. Heavier materials such as gas oil and similar hydrocarbon streams can be treated under conditions of about 500 to about 2,500 psi (3.45 to 17.24 MPa) hydrogen partial pressure and an average catalyst bed temperature within the range of about 600° F. (315° C.) to about 820° F. (438° C.) with an LHSV (liquid hourly space velocity) within the range of about 0.5–10 volumes of hydrocarbon per hour per volume of catalyst and a hydrogen recycle rate or hydrogen addition rate within the range of about 1,000 SCFB to about 10,000 SCFB (178 to 1780 m³/m³). Best results in the removal of sulfur and nitrogen from gas oils have been obtained under conditions of about 1,000 psi to about 2,000 psi (6.9–13.8 MPa) hydrogen partial pressure and average catalyst bed temperatures within the range of about 700° to about 820° F. (371° to 438° C.) at an LHSV of about 1–8 volumes of hydrocarbon per hour per volume of catalyst and a hydrogen recycle rate or hydrogen addition rate within the range of about 1000 SCFB to about 6000 SCFB (178 to 1069 m³/m³).

The following examples are illustrative of this invention but do not indicate limitation upon the scope of the claims.

EXAMPLE I

Catalyst A, representing an embodiment of the catalyst employed in the process of this invention, was prepared to contain approximately 10 wt.% $Cr_2O_3$, 8 wt.% $MoO_3$, and 1.5 wt.% CoO, with properties fully specified in Table II. This catalyst was prepared with a gamma-alumina support in the form of 1/32" (0.08 cm) extrudates, commercially obtainable from American Cyanamid Company, having a surface area of about 204 m²/gm, an average pore diameter of about 151 Angstroms, and a pore volume of about 0.77 cc/gm, wherein the pore volume comprised the following exemplary distribution:

| Pore Diameters, Å | % of Pore Volume |
|---|---|
| 0–50 | 1.5 |
| 50–100 | 65.3 |
| 100–150 | 32.2 |
| 150+ | 1.0 |

The gamma alumina extrudate support was impregnated with a mixture of two solutions prepared as follows:
 To an agitated vessel containing 1518 gms. of deionized water, 1518 gms. of Chromic Acid ($CRO_3$) was added. After dissolution of the Chromic Acid, 966 gms. of Cobalt Nitrate solution (concentration 15.5% CoO) was added.
b. To an agitated vessel containing 3275 gms. of warm (ca. 65° C.) deionized water, 1356 gms. of Ammonium Dimolybdate (85% $MoO_3$) was added.
c. Prior to impregnation, solution (b) was added to solution (a) with mixing. Specific gravity of the complex solution at 48° C. was measured at 1.33 by hydrometer.

Impregnation

Twenty pounds (9.06 kg) of the blank gamma-alumina extrudates were charged to a baffled rotating drum. The complex solution of (2) above (cooled to ambient temperature) was distributed onto the tumbling bed of extrudates over a period of ten minutes and mixing was continued until the extrudates were free flowing.

Finishing

The wet impregnated extrudates, after aging for 90 minutes, were charged to an indirect fired batch rotary calciner which had been preheated to 600° F. (315° C.). Air at 1 CFM (28.3 1/min.) was blown across the bed of extrudates to sweep out volatiles. Bed temperature was brought to 1000° F. and held at this temperature for one hour, after which the calcined product was discharged.

Heavy vacuum gas oil, with properties presented in Table I, was hydrotreated in an embodiment of the process of this invention, with Catalyst A containing approximately 10 wt.% $Cr_2O_3$, 8 wt.% MoO, and 1.5 wt.% CoO on a high surface area alumina support, with catalyst properties more fully specified in Table II.

Prior to its use, the catalyst was calcined in still air at a temperature of about 1,000° F. (537° C.) for one hour and cooled in a desiccator. Before establishing hydrocarbon flow, the catalyst was subjected to a conventional presulfiding with a gas mixture containing about 8 mole % hydrogen sulfide in hydrogen at a pressure of approximately 500 psig (3.45 MPa), with the temperature slowly raised from 300° F. (148° C.) to about 700° F. (371° C.).

The run was carried out in a bench-scale test unit having automatic controls for pressure, flow of reactants, and temperature. The reactor was made from ⅜-inch (0.95 cm) inside diameter stainless steel, heavy-walled tubing. A ⅛-inch (0.32 cm) outside diameter thermowell extended up through the center of the reactor. The reactor was heated by an electrically-heated steel block. The hydrocarbon feedstock was fed to the unit by means of a Ruska pump, a positive-displacement pump. The 14-to-20-mesh catalyst material was supported on 8-to-10-mesh alundum particles. Approximately 15 cubic centimeters of the catalyst was employed. This amount of catalyst provided a catalyst bed length of about 10 inches. A 10-inch layer of 8-to-10-mesh alundum particles was placed over the catalyst bed in the reactor. The catalyst was placed in the annular space between the thermowell and the internal wall of the ⅜-inch (0.95 cm) inside-diameter reactor.

Selected samples from the run were obtained from the product receiver and were analyzed for pertinent information. Data obtained from samples taken during the indicated day of operation at an LHSV of 1.0 volume of hydrocarbon per hour per volume of catalyst, a temperature of 800° F. (427° C.), and a pressure of 1400 psig (9.65 MPa) with 2000 SCFB (356 m³/m³), are presented hereinbelow as Run 1 in Table IV and in FIG. 2.

EXAMPLE 2

For comparison, the heavy vacuum gas oil described in Example 1 was hydrotreated using a commercial hydrodesulfurization catalyst obtained from the Nalco Chemical Company, designated Nalco 477, containing approximately 3.5 wt.% CoO and 15 wt.% $MoO_3$ on an alumina support, with catalyst properties more fully specified in Table I as Catalyst B. This operation was conducted in the same bench-scale equipment with conditions and catalyst pretreatment as described in Example 1. The results of this operation are presented as Run 2 in Table IV and in FIGS. 1 and 2.

EXAMPLE 3

For comparison, the heavy vacuum gas oil previously described in Example 1 was hydrotreated using a commercial hydrodenitrification catalyst obtained from Nalco Chemical Company, designated NM506, containing approximately 7 wt.% NiO and 25 wt.% $MoO_3$ on an alumina support, with properties more fully specified in Table II, as Catalyst C. This operation was carried out in the same bench-scale equipment with conditions and catalyst pretreatment as described in Example 1. Results of this operation are presented as Run 3 in Table IV and in FIGS. 1 and 2.

EXAMPLE 4

Catalyst D, representing an embodiment of the catalyst employed in the process of the present invention, was prepared to contain approximately the same levels of hydrogenation components as those contained in Catalyst A; however, Catalyst D was prepared using a successive impregnation technique as follows: the catalyst was prepared with a gamma-alumina support in the form of 1/32" (0.08 cm) extrudates, commercially obtained from the American Cyanamid Company, having a surface area of approximately 192 m²/gm, an average pore diameter of about 159 Å and a pore volume of about 0.76 cc/gm, wherein the pore volume comprised the following exemplary distribution:

| Pore Diameters, Å | % of Pore Volume |
| --- | --- |
| 0–50 | 1.3 |
| 50–100 | 53.8 |
| 100–150 | 43.6 |
| 150+ | 1.3 |

A sample of this support was calcined at approximately 1,000° F. (537° C.) for about one hour. 162.5 gm of the calcined support was impregnated with 220 ml of distilled water containing 34.2 gm of ammonium dichromate and 25.3 gm ammonium molybdate. The resulting mixture was left to stand overnight. This mixture was dried subsequently under a heat lamp in static air for a period of about 2 hours to remove the excess water. The dried material was then calcined in static air at a temperature of approximately 1,000° F. (537° C.) for a period of about 2 hours. 99.2 gm of this calcined material was then impregnated with a solution containing 5.0 gm of $Co(NO_3)_2 \cdot 6H_2O$ in 100 ml of distilled water and this mixture was allowed to stand overnight. The material was then dried under a heat lamp in static air for a period of about 2 hours and the dried material was then calcined in static air at a temperature of 1,000° F. (537° C.) for a period of about 2 hours.

The finished Catalyst D was analyzed to contain 1.5 wt.% CoO, 8.4 wt.% $MoO_3$, and 9.5 wt.% $Cr_2O_3$. For comparison, Catalyst D was tested using the same feedstock, equipment, catalyst pretreatment, and conditions of operation as described in Example 1. The results of this operation are presented as Run 4 in Table IV.

EXAMPLE 5

Catalyst E, representing a preferred embodiment of the catalyst employed in the process of the present invention, was prepared to contain approximately the same levels of hydrogenation components as those contained in Catalyst A; however, Catalyst E was prepared on a different support and using a successive impregnation technique as follows: the catalyst was prepared with a gamma-alumina support in the form of 1/16" (0.16 cm) extrudates, commercially obtained from the Continental Oil Company under the tradename "CATAPAL," having a surface area of approximately 263 m²/gm, an average pore diameter of about 87 Å and a pore volume of about 0.57 cc/gm, wherein the pore volume comprised the following exemplary distribu-
tion:

| Pore Diameters, Å | % of Pore Volume |
|---|---|
| 0–50 | 43.9 |
| 50–100 | 53.3 |
| 100–150 | 1.1 |
| 150+ | 1.7 |

A sample of this support was calcined at approximately 1,000° F. (537° C.) for about one hour. 136.6 gm of the calcined support was impregnated with 100 ml of distilled water containing 28.3 gm of ammonium dichromate and 21.0 gm ammonium molybdate. The resulting mixture was left to stand overnight. This mixture was dried subsequently under a heat lamp in static air for a period of about 2 hours to remove the excess water. The dried material was then calcined in static air at a temperature of approximately 1,000° F. (537° C.) for a period of about 2 hours. 82.0 gm of this calcined material was then impregnated with a solution containing 4.1 gm of $Co(NO_3)_2 \cdot 6H_2O$ in 50 ml of distilled water and this mixture was allowed to stand overnight. The material was then dried under a heat lamp in static air for a period of about 2 hours and the dried material was then calcined in static air at a temperature of 1,000° F. (537° C.) for a period of about 2 hours.

The finished Catalyst E was analyzed to contain 1.3 wt.% CoO, 9.4 wt.% $MoO_3$, and 11.0 wt.% $Cr_2O_3$. For comparison, Catalyst E was tested using the same feedstock, equipment, catalyst pretreatment, and conditions of operation as described in Example 1. The results of this operation are presented as Run 5 in Table IV.

EXAMPLE 6

Catalyst F was prepared by reimpregnating Catalyst A with sufficient cobalt nitrate to provide higher cobalt level indicated by analysis of the finished catalyst to be 3.3 wt.% CoO, 8.4 wt.% $MoO_3$, and 9.9 wt.% $Cr_2O_3$. For comparison, Catalyst F was tested using the same feedstock, equipment, catalyst pretreatment, and conditions of operation as described in Example 1. The results of this operation are presented as Run 6 in Table V.

EXAMPLE 7

Catalysts G and H were prepared with the same support and in the same manner as the preparation of Catalyst D with the exception that appropriate adjustments in the amount of ammonium dichromate used were made in order to prepare Catalyst G with lower chromium content than Catalyst A and to prepare Catalyst H with higher chromium content than Catalyst A. Catalyst G contained approximately 5 wt.% $Cr_2O_3$, and Catalyst H contained approximately 20 wt.% $Cr_2O_3$; actual analyses of Catalysts G and H are presented in Table III. Tests of Catalysts G and H were carried out using the same feedstock, equipment, catalyst pretreatment, and conditions of operation as described in Example 1. The results of these operations are presented as Runs 7 and 8 in Table V.

EXAMPLE 8

Catalyst I was prepared with similar support and in the same manner as the preparation of Catalyst D with the exception that the finished catalyst contained approximately 3 wt.% CoO, 8 wt.% $Cr_2O_3$, and 8 wt.% $MoO_3$. This catalyst was employed in the hydrotreatment of the whole shale oil feedstock described in Table I using similar equipment and catalyst pretreatment as described in Example 1. The conditions and results of this operation are presented in Table VIII.

TABLE I

| FEEDSTOCK PROPERTIES | | | |
|---|---|---|---|
| | A<br>Heavy<br>Vacuum<br>Gas Oil | B<br>Tar Sands<br>Coker<br>Gas Oil | C<br>Whole<br>Shale Oil |
| Gravity, °API | 19.7 | 8.0 | 21.0 |
| Nitrogen, Wt. % | 0.149 | .374 | 1.88 |
| Sulfur, Wt. % | 2.87 | 4.6 | 0.78 |
| Carbon, Wt. % | 85.18 | 85.14 | 84.89 |
| Hydrogen, Wt. % | 11.80 | 9.92 | 9.92 |
| Oxygen, Wt. % | — | — | 1.4 |
| ASTM DISTILLATION | | | |
| IBP °F. | 577 | 438 | 116 |
| 5% °F. | 670 | 621 | 361 |
| 10% °F. | 713 | 669 | 426 |
| 20% °F. | 766 | 727 | 526 |
| 30% °F. | 802 | 768 | 614 |
| 50% °F. | 859 | 835 | 773 |
| 70% °F. | 914 | 904 | 917 |
| 80% °F. | 946 | 947 | 1000 |

TABLE II

| CATALYST PROPERTIES | | | | | |
|---|---|---|---|---|---|
| CATALYST | A | B | C | D | E |
| HYDROGENATION | | | | | |
| COMPONENT, Wt. % | | | | | |
| CoO | 1.5 | 3.4 | — | 1.5 | 1.3 |
| $Cr_2O_3$ | 10.1 | — | — | 9.5 | 11.0 |
| $MoO_3$ | 8.6 | 15.3 | 24.8 | 8.4 | 9.4 |
| NiO | — | — | 6.9 | — | — |
| PHYSICAL PROPERTIES | | | | | |
| SURFACE AREA, m²/gm | 179 | 208 | 219 | 170 | 226 |
| PORE VOLUME, cc/gm | 0.58 | 0.58 | 0.40 | 0.57 | 0.44 |
| AVG. PORE DIAM., Å | 130 | 112 | 73 | 135 | 78 |
| % OF PORE VOLUME IN: | | | | | |
| 0–50 Å PORES | 4.9 | 7.5 | 12.1 | 4.7 | 38.0 |
| 50–100 Å PORES | 75.0 | 64.4 | 84.4 | 58.0 | 59.5 |
| 100–150 Å PORES | 19.6 | 16.2 | 0.8 | 35.8 | 1.2 |
| 150+ Å PORES | 0.5 | 11.9 | 2.1 | 1.5 | 1.3 |

TABLE III

| CATALYST PROPERTIES | | | | |
|---|---|---|---|---|
| CATALYST | A | F | G | H |
| HYDROGENATION | | | | |
| COMPONENT, WT. % | | | | |
| CoO | 1.5 | 3.3 | 1.4 | 1.2 |
| $Cr_2O_3$ | 10.1 | 9.9 | 4.7 | 18.1 |
| $MoO_3$ | 8.6 | 8.4 | 9.5 | 7.9 |
| NiO | — | — | — | — |
| PHYSICAL PROPERTIES | | | | |
| SURFACE AREA, m²/gm | 179 | 179 | 185 | 157 |
| PORE VOLUME, cc/gm | 0.58 | 0.56 | 0.63 | 0.50 |
| AVG. PORE DIAM., Å | 130 | 125 | 135 | 128 |
| % OF PORE VOLUME IN: | | | | |
| 0–50 Å PORES | 4.9 | 5.4 | 4.0 | 7.2 |
| 50–100 Å PORES | 75.0 | 69.5 | 61.8 | 59.7 |
| 100–150 Å PORES | 19.6 | 24.0 | 33.0 | 28.4 |
| 150+ Å PORES | 0.5 | 1.1 | 1.2 | 4.7 |

Figure 2:
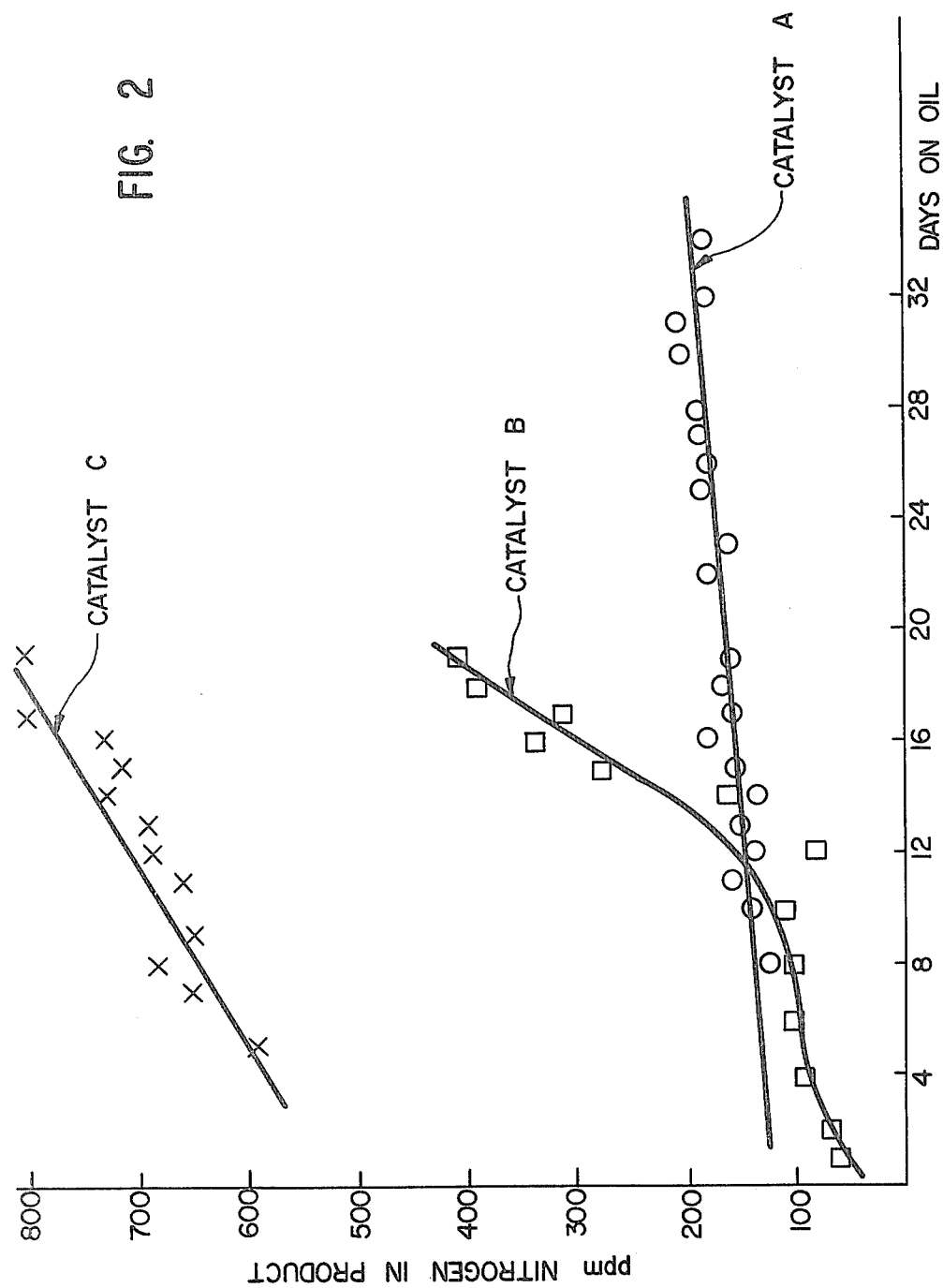
FIG. 2 depicts comparative denitrogenation performance of commercial catalysts and a catalyst employed in the process of this invention.

As Table IV and FIGS. 1 and 2 demonstrate, the catalyst employed in the process of this invention, represented by Catalyst A, while indicating an initial period of activation for sulfur removal is clearly superior to commercial Catalysts B and C in sulfur and nitrogen removal performance. The catalysts employed in the process of this invention are surprisingly resistant to deactivation under the demonstrated relatively severe conditions of operation.

TABLE IV

| RUN NO. | 1 | 2 | 3 | 4 | 5 |
|---|---|---|---|---|---|
| CATALYST | A | B | C | D | E |
| OPERATING CONDITIONS | | | | | |
| TEMPERATURE, °F. | 800 | 800 | 800 | 800 | 800 |
| PRESSURE, psig | 1400 | 1400 | 1400 | 1400 | 1400 |
| LHSV | 1.0 | 1.0 | 1.0 | 1.0 | 1.0 |
| HYDROGEN RATE, SCFB | 2000 | 2000 | 2000 | 2000 | 2000 |
| SAMPLE FROM DAY | 16 | 16 | 16 | 12 | 20 |
| PRODUCT | | | | | |
| % SULFUR REMOVAL | 99.0 | 92.0 | 91.2 | 98.6 | 99.7 |
| % NITROGEN REMOVAL | 88.0 | 79.8 | 53.5 | 84.8 | 96.1 |
| LIQUID GRAVITY, °API | 32.3 | 31.3 | 31.9 | 32.9 | 33.4 |

Table V demonstrates that the cobalt oxide level of about 3 wt.% in Catalyst F appears to produce a reduction in sulfur and nitrogen removal performance when compared to the performance of Catalyst A having a lower cobalt oxide content. The performance of Catalyst G which has lower chromium content than Catalyst A resulted in decreased sulfur and nitrogen removal by comparison. The performance of Catalyst H indicates that a higher level of chromium oxide at about 20 wt.% can provide approximately the same performance as Catalyst A having the lower level of about 10 wt.% $Cr_2O_3$.

TABLE V

| RUN NO. | 1 | 6 | 7 | 8 |
|---|---|---|---|---|
| CATALYST | A | F | G | H |
| OPERATING CONDITIONS | | | | |
| TEMPERATURE, °F. | 800 | 800 | 800 | 800 |
| PRESSURE, psig | 1400 | 1400 | 1400 | 1400 |
| LHSV | 1.0 | 1.0 | 1.0 | 1.0 |
| HYDROGEN RATE, SCFB | 2000 | 2000 | 2000 | 2000 |
| SAMPLE FROM DAY | 6 | 6 | 6 | 6 |
| PRODUCT | | | | |
| % SULFUR REMOVAL | 99.0 | 95.5 | 93.8 | 99.3 |
| % NITROGEN REMOVAL | 89 | 48.0 | 54.6 | 85.4 |
| LIQUID GRAVITY, °API | 32.3 | 32.5 | 31.1 | 32.5 |

Table VI presents results treating Feedstock A, showing variation in space velocity and indicating that Catalyst E produces particularly effective sulfur and nitrogen removal even under relatively high hydrocarbon flow rates corresponding to space velocity of about 3 LHSV and 6 LHSV.

TABLE VI

| CATALYST | A | A | E | E | E |
|---|---|---|---|---|---|
| OPERATING CONDITIONS | | | | | |
| TEMPERATURE, °F. | 800 | 800 | 800 | 800 | 800 |
| PRESSURE, psig | 1400 | 1400 | 1400 | 1400 | 1400 |
| LHSV | 1 | 2 | 1 | 3 | 6 |
| HYDROGEN RATE, SCFB | 2000 | 2000 | 2000 | 2000 | 2000 |
| SAMPLE FROM DAY | 10 | 8 | 3 | 6 | 8 |
| PRODUCT | | | | | |
| % SULFUR REMOVAL | 99.5 | 96.9 | 99.7 | 98.6 | 92.3 |
| % NITROGEN REMOVAL | 89.1 | 69 | 88.0 | 45.0 | — |
| LIQUID GRAVITY, °API | 32.9 | 30.0 | 33.8 | 29.8 | 28.1 |

Table VII and FIG. 3 presents results showing the conversion of Feedstock B, a gas oil fraction from coked tar sands oil, using Catalyst A in an embodiment of the process of this invention. These results demonstrate that very little light-end gases were produced when the heavy gas oil was hydrocracked to yield predominantly distillate range product with substantial removal of sulfur and nitrogen as indicated.

TABLE VII

| DAYS ON OIL | 5 | 7 | 8 | 16 | 18 |
|---|---|---|---|---|---|
| OPERATING CONDITIONS | | | | | |
| TEMPERATURE, °F. | 780 | 780 | 780 | 780 | 780 |
| PRESSURE, psig | 1800 | 1800 | 1800 | 1400 | 1000 |
| LHSV | 0.5 | 0.25 | 1.0 | 0.5 | 0.5 |
| HYDROGEN RATE, SCFB | 1810 | 2040 | 1500 | 1275 | 1030 |
| PRODUCT | | | | | |
| % SULFUR REMOVAL | 99.6 | 96.6 | 98.3 | 99.3 | 96.8 |
| % NITROGEN REMOVAL | 97.6 | 98.9 | 84.0 | 92.5 | 33.9 |
| % CONVERSION OF 650° F. + MATERIAL | 60 | 67 | 45 | 49 | 47 |
| LIQUID GRAVITY, °API | 29.1 | 31.1 | 25.0 | 27.4 | 26.3 |
| $C_1$-$C_4$ WT. % | 5.1 | 5.0 | 4.5 | 3.0 | 3.6 |

Table VIII presents results showing the hydrotreatment of Feedstock C, a whole shale oil, using Catalyst I described in Example 8. These results demonstrate that the process of this invention can substantially remove even the very high nitrogen content from a shale oil.

TABLE VIII

| DAYS ON OIL | 3 | 6 | 16 | 27 |
|---|---|---|---|---|
| OPERATING CONDITIONS | | | | |
| PRESSURE, psig | 1700 | 1700 | 1700 | 1700 |
| LHSV | 1.0 | 0.5 | 1.0 | 2.0 |
| TEMPERATURE, °F. | 730 | 730 | 760 | 780 |
| HYDROGEN RATE, SCFB | | | | |
| PRODUCT | | | | |
| LIQUID GRAVITY, °API | 30.8 | 33.7 | 33.5 | 32.9 |
| % NITROGEN REMOVAL | 57.8 | 77.5 | 68.5 | 51.3 |
| % SULFUR REMOVAL | 93.7 | 96.2 | 97.5 | 88.6 |

Overall, the catalyst employed in the process of this invention, best represented by Catalyst E, enables improved removal of sulfur and nitrogen in the hydrotreatment of petroleum distillates and similar hydrocarbon materials.

We claim:

1. A process for hydrotreating a hydrocarbon stream to remove nitrogen and sulfur which process comprises contacting a hydrocarbon stream comprising a stream selected from petroleum distillate, tar sands distillate, and shale oil, with hydrogen and a catalyst comprising a porous refractory inorganic oxide and deposited thereon hydrogenation components comprising chromium, molybdenum and at least one Group VIII metal said catalyst having a pore volume distribution comprising 20-50% of pore volume in pores with diameters of 0-50 Angstrom units, 30-70% of pore volume in pores with diameters of 50-100 Angstrom units, 0-20% of pore volume in pores with diameters of 100-150 Angstrom units, and 0-10% of pore volume in pores with diameters greater than 150 Angstrom units.

2. The process of claim 1 wherein said Group VIII metal comprises cobalt.

3. The process of claim 2 wherein said catalyst comprises chromium, molybdenum and cobalt hydrogenation components in at least one form selected from the group consisting of the elemental form, the oxide, and the sulfide.

4. The process of claim 3 wherein said chromium is present in an amount within the range of about 5 wt.% to about 30 wt.%, calculated as $Cr_2O_3$ and based upon the total catalyst weight, said molybdenum is present in an amount within the range of about 5 wt.% to about 20 wt.%, calculated as $MoO_3$ and based upon the total catalyst weight, and said cobalt is present in an amount within the range of about 0.1 wt.% to about 5 wt.%, calculated as CoO and based upon the total catalyst weight.

5. The process of claim 3 wherein said chromium is present in an amount within the range of about 7 wt.% to about 20 wt.%, calculated as $Cr_2O_3$ and based upon the total catalyst weight, said molybdenum is present in an amount within the range of about 7 wt.% to about 15 wt.%, calculated as $MoO_2$ and based upon the total catalyst weight, and said cobalt is present in an amount within the range of about 0.5 wt.% to about 2.5 wt.%, calculated as CoO and based upon the total catalyst weight.

6. The process of claim 1 wherein said catalyst is prepared by impregnating said support with aqueous solution of heat-decomposable compounds of said hydrogenation metals.

7. The process of claim 1 wherein said process is carried out under conditions comprising an average catalyst bed temperature within the range of about 700° F. (371° C.) to about 820° F. (438° C.) and hydrogen partial pressure in the range of about 500 psi to about 2,500 psi (3.45 to 17.24 MPa).

8. The process of claim 1 wherein said hydrocarbon stream comprises petroleum gas oil.

9. The process of claim 1 wherein said hydrocarbon stream comprises tar sands gas oil.

10. A process for hydrotreating a hydrocarbon stream to remove nitrogen and sulfur which process comprises contacting a hydrocarbon stream comprising a stream selected from petroleum distillate, tar sands distillate, and shale oil, with hydrogen and a catalyst comprising alumina support and deposited thereon hydrogenation components comprising chromium, molybdenum and at least one Group VIII metal said catalyst having a pore volume distribution comprising 20–50% of pore volume in pores with diameters of 0–50 Angstrom units, 30–70% of pore volume in pores with diameters of 50–100 Angstrom units, 0–20% of pore volume in pores with diameters of 100–150 Angstrom units, and 0–10% of pore volume in pores with diameters greater than 150 Angstrom units.

11. The process of claim 10 wherein said Group VIII metal comprises cobalt.

12. The process of claim 11 wherein said catalyst comprises chromium, molybdenum and cobalt hydrogenation components in at least one form selected from the group consisting of the elemental form, the oxide, and the sulfide.

13. The process of claim 12 wherein said chromium is present in an amount within the range of about 5 wt.% to about 30 wt.%, calculated as $Cr_2O_3$ and based upon the total catalyst weight, said molybdenum is present in an amount within the range of about 5 wt.% to about 20 wt.%, calculated as $MoO_3$ and based upon the total catalyst weight, and said cobalt is present in an amount within the range of about 0.1 wt.% to about 5 wt.%, calculated as CoO and based upon the total catalyst weight.

14. The process of claim 11 wherein said chromium is present in an amount within the range of about 7 wt.% to about 20 wt.%, calculated as $Cr_2O_3$ and based upon the total catalyst weight, said molybdenum is present in an amount within the range of about 7 wt.% to about 15 wt.%, calculated as $MoO_3$ and based upon the total catalyst weight, and said cobalt is present in an amount within the range of about 0.5 wt.% to about 2.5 wt.%, calculated as CoO and based upon the total catalyst weight.

15. The process of claim 11 wherein said hydrocarbon stream comprises petroleum distillate.

16. The process of claim 11 wherein said hydrocarbon stream comprises tar sands distillate.

17. The process of claim 11 wherein said hydrocarbon stream comprises shale oil.

18. The process of claim 1 wherein said catalyst has a pore volume within the range of about 0.4 cc/gm to about 0.8 cc/gm and a surface area within the range of about 150 m²/gm to about 300 m²/gm.

19. The process of claim 11 wherein said catalyst has a pore volume within the range of about 0.4 cc/gm to about 0.8 cc/gm and a surface area within the range of about 150 m²/gm to about 300 m²/gm.

20. The process of claim 19 wherein said hydrocarbon stream comprises petroleum gas oil.

21. The process of claim 19 wherein said hydrocarbon stream comprises tar sands gas oil.

22. The process of claim 19 wherein said hydrocarbon stream comprises shale oil.

23. The process of claim 10 wherein said catalyst is prepared by impregnating said support with aqueous solution of heat-decomposable compounds of said hydrogenation metals.

24. The process of claim 14 wherein said catalyst has a pore volume within the range of about 0.4 cc/gm to about 0.8 cc/gm and a surface area within the range of about 150 m²/gm to about 300 m²/gm.

25. The process of claim 14 wherein said process is carried out under conditions comprising an average catalyst bed temperature within the range of about 700° F. (371° C.) to about 820° F. (438° C.) and hydrogen partial pressure in the range of about 500 psi to about 2,500 psi (3.45 to 17.24 MPa).

26. The process of claim 25 wherein said hydrocarbon stream comprises petroleum gas oil.

27. The process of claim 25 wherein said hydrocarbon stream comprises tar sands gas oil.

28. The process of claim 25 wherein said hydrocarbon stream comprises shale oil.

* * * * *

UNITED STATES PATENT OFFICE
CERTIFICATE OF CORRECTION

Patent No. 4,224,144     Dated September 23, 1980

Inventor(s) Albert L. Hensley, Jr. et al

It is certified that error appears in the above-identified patent and that said Letters Patent are hereby corrected as shown below:

| Patent Column | Line | |
|---|---|---|
| 1 | 23-24 | "hydros-weetening" should be --hydro-sweetening-- |
| 4 | 37 | "If" should be --In-- |
| 5 | 48 | "A.P.D.=average pore diameter in A" should be --A.P.D. = average pore diameter in $\overset{o}{A}$-- |
| 6 | 44 | "To an agitated" should be --a. To an agitated-- |
| 7 | 42 | "operation at an" should be --operation conducted at an-- |
| 10 | 6 | "Whole" should be --Whole-- |
| 13 | 12 | "$MoO_2$ and" should be --$MoO_3$-- |

Signed and Sealed this

Fourteenth Day of April 1981

[SEAL]

Attest:

RENE D. TEGTMEYER

Attesting Officer      Acting Commissioner of Patents and Trademarks